United States Patent [19]

Mostert

[11] Patent Number: 4,824,889

[45] Date of Patent: Apr. 25, 1989

[54] POLY-1-BUTENE BLEND ADHESIVES

[75] Inventor: Simon Mostert, Cypress, Tex.

[73] Assignee: Shell Oil Company, Houston, Tex.

[21] Appl. No.: 115,682

[22] Filed: Oct. 30, 1987

[51] Int. Cl.⁴ .................... C08L 23/20; C08L 45/00
[52] U.S. Cl. ........................... 524/232; 524/240;
   524/291; 524/488; 524/528; 524/518; 525/210;
   525/240; 428/461; 428/516
[58] Field of Search .......... 524/528, 488, 291, 240,
   524/232; 525/210, 211, 240

[56] References Cited

U.S. PATENT DOCUMENTS

| | | | |
|---|---|---|---|
| 3,251,792 | 5/1966 | Homberg | 260/23 |
| 3,362,940 | 11/1968 | Edwards et al. | 260/88.2 |
| 3,370,036 | 2/1968 | Martinovich | 260/45.85 |
| 3,573,240 | 3/1971 | Flanagan | 525/240 |
| 3,849,520 | 11/1974 | Bullard et al. | 525/240 |
| 3,869,416 | 3/1975 | Hon | 260/27 |
| 4,031,058 | 6/1977 | Cella, Jr. | 260/33.8 |
| 4,164,427 | 8/1979 | Godfrey | 106/218 |
| 4,279,659 | 7/1981 | Unmuth | 106/230 |
| 4,284,541 | 8/1981 | Takeda et al. | 260/27 |
| 4,390,677 | 6/1983 | Karol et al. | 526/348.6 |
| 4,410,677 | 10/1983 | Lampe | 528/17 |
| 4,451,633 | 5/1984 | Brownscombe et al. | 526/348.6 |
| 4,454,281 | 6/1984 | Heitz et al. | 524/399 |
| 4,460,364 | 7/1984 | Chen et al. | 604/387 |
| 4,554,304 | 11/1985 | Hansen et al. | 524/291 |
| 4,554,321 | 11/1985 | Hwo et al. | 525/240 |
| 4,568,713 | 2/1986 | Hansen et al. | 524/291 |
| 4,645,792 | 2/1987 | Chatterjee | 524/232 |
| 4,658,713 | 4/1987 | Nagaoka | 99/636 |

OTHER PUBLICATIONS

Litz-Escorez® Resins in Hot Melt Adhesives-Exxon Chem. Co.-Exxon Technical Report ©1979-Specialties Tech Division-pp. 1 & 2 & Appendix B.

Primary Examiner—Carman J. Seccuro
Attorney, Agent, or Firm—Wendy K. B. Buskop

[57] ABSTRACT

A hot melt adhesive comprising a blend of:
from about 10% by weight to about 90% by weight of a blend of from 10% by weight to 90% by weight of an at least partially crystalline copolymer of butene-1 and ethylene, wherein the ethylene content is from about 1 mole percent to about 20 mole percent of said copolymer, and from 10% by weight to 90% by weight of a butene-1 homopolymer;
from about 10% by weight to about 90% by weight of a tackifying resin; and
from about 0.1 phr to about 0.5 phr of an antioxidizing agent.

7 Claims, 1 Drawing Sheet

SAFT AND LAP SHEAR FOR
(HOMO/COPOLYMER)/ARKON P85 50/50 BLENDS

□ SAFT
× LAP SHEAR

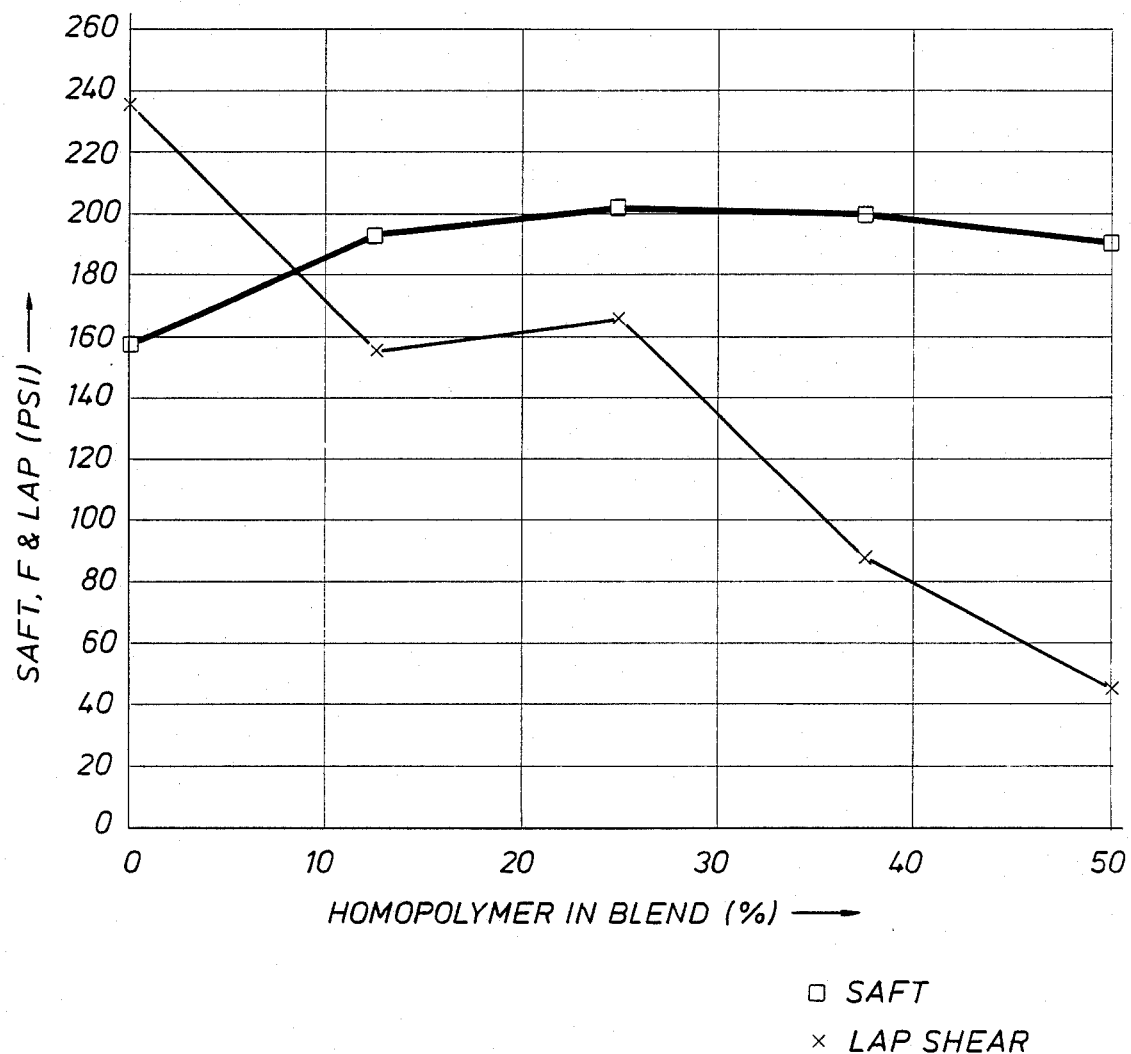

POLY-1-BUTENE BLEND ADHESIVES

BACKGROUND OF THE INVENTION

This invention relates to hot melt adhesives which exhibit good high temperature performance and adhesion. In particular, this invention relates to hot melt butene-1 and ethylene copolymer adhesives. The present invention is an improvement over U.S. Pat. No. 4,568,713.

Hot melt adhesives can be formulated to be pressure sensitive and have an infinite open time but these adhesives are usually soft, tacky and have limited strength and adhesion. Conventional hot melts such as formulations of poly(ethylene/vinylacetate), polyethylenes, polyamides, or polyesters are rigid, form good strong bonds to certain substrates but have short open times usually less than 1 minute. Moreover, these adhesives usually have problems in adhering to cold metal substrates.

Solvent applied contact adhesives can be formulated to give good bond strengths and reasonable open times but since they require the use of solvents, which can cause toxicity, pollution, and fire hazards, solvent applied adhesives can have significant drawbacks. The instant polybutylene hot melt adhesives are unique in that they require no solvents, have good T-peel, good SAFT, and show improved adhesion to cold metal substrates, such as aluminum substrates.

The poly-1-butene polymers are a unique group of olefinic polymers because they crystallize very slowly. The very slow crystallization rate, in contrast to the crystallization rates of other polyolefin crystalline polymers, such as EVAs, polyethylenes and polypropylenes, has been found to provide long open times as well as good adhesion and bonding to cold, heat-sink type substrates—metals such as stainless steel and anodized aluminum, for example.

U.S. Pat. No. 4,568,713 teaches polybutene-based hot melt adhesives containing either poly-1-butene copolymers or poly-1-butene homopolymers and tackifying resins. This broad patent, does not identify certain unexpected results relative to SAFT and T-peel values obtained by incorporating certain carefully selected proportions of poly-1-butene homopolymer with poly-1-butene copolymer in adhesives blends containing a tackifying resin.

Polybutylene polymers usable in the present invention are composed of linear chain molecules with a regular and spacially ordered arrangement of ethyl side groups, the pendant groups that result when one butene is polymerized across the 1,2 carbon double bond (along an ethylene chain backbone) (see U.S. Pat. No. 3,362,940). When cooled from melt, the ethyl side groups initially align in a tetragonal spatial arrangement, developing a little over one half of the ultimate crystallinity (form II). With time, the tetragonal crystalline phase transforms into a stable hexagonal spatial arrangement with subsequent development of additional crystallinity (form I). This is a very slow process, the transformation being completed in the neat polymer over a period of several days.

Butene-1 can be copolymerized with a variety of alpha-olefins to provide useful copolymers such as those taught in U.S. Pat. No. 3,362,940. Butene-1/ethylene copolymers, with ethylene monomer in the 5.5–20 mole percent range have been taught in U.S. Pat. No. 4,568,713, and U.S. Pat. No. 3,362,940 and it has not been discovered that copolymers of this type with low ethylene comonomer contents, (1–6 w %) are of special interest in hot melt adhesives. The slight amount of ethylene comonomer may produce a lower glass transition temperature ($T_g$) and increase the amount of amorphous phase in the polymer. The slight amount of ethylene may further reduce the crystallization rate. These polymers provide many advantages in the development of hot melt adhesives, such as a lower $T_g$ and a higher amorphous phase. These polymers offer wider formulating latitude in combination with compatible resins, waxes, oils, fillers and additives.

SUMMARY OF THE INVENTION

It has been surprisingly found that certain blends of (1) poly-1-butene/ethylene copolymers, where the ethylene content of the copolymers ranges from about 1% by weight to about 20% by weight, and (2) poly-1-butene homopolymer with tackifying resin, an antioxidant and optionally, an amount of a microcrystalline wax and/or an amount of atactic polypropylene, provide adhesive formulations which exhibit unexpected SAFT and T-peel results when compared with adhesives comprising only poly-1-butene homopolymer and tackifying resin and only poly-1-butene copolymer and tackifying resin.

More specifically, it has been surprisingly found that for the adhesive, the shear adhesion failure temperature (SAFT) may be controlled to remain sufficiently high while obtaining high T-peel values when the adhesive is applied to a variety of substrates.

Product uses of the novel adhesive blend of the present invention include but are not limited to adhesives for: the assembly of products such as disposable products, small hand-held appliances, carpet manufacture, automotive adhesives and sealants. DRAWING FIG. 1 is a graph of the shear adhesion failure temperature and LAP shear (in psi) in relation to the weight percent of poly-1-butene homopolymer incorporated in a 50/50 hot melt adhesive of poly-1-butene homopolymer and poly-1-butene copolymer and tackifying resin disposed on a polybutene substrate, wherein the advantageous proportions of the blend of homopolymer to copolymer range from 12.5:37.5 to 25:25, respectively.

DETAILED DESCRIPTION OF THE INVENTION

The preferred copolymer of the present invention is a polybutene-1 copolymer with from about 1 mole percent to about 20 mole percent ethylene comonomer. Exemplary, polymers discussed hereinafter are identified as H-1-B (homopolymeric-1-butene) and 1B-CoE 6 (copolymeric 1-butene with 6 mole percent ethylene).

It has been found that hot melt adhesives prepared from 50% by weight based on the entire formulation of a blend of H-1-B and 1B-CoE 6 and 50% by weight of a tackifying resin showed unexpected results when 10–90% H-1-B and 90–10% of 1B-CoE 6 were blended with tackifier resin and tested on a polypropylene substrate. When 20–80% H-1-B and 80–20% 1B-CoE 6 of the polymer blend were incorporated in an adhesive formulation, high SAFT was obtained simultaneously with high T-peel on aluminum substrates.

Lap shear and SAFT properties of comparative control adhesives prepared with only homopolymer of butene-1 (H-1-B) or only butene-1 copolymer (1B-CoE 6) on polybutene substrates are shown in Table 1.

Table 2 shows SAFT and T-peel on aluminum and polypropylene substrates for the inventive adhesive formulations comprising various proportions of blended H-1-B with 1B-CoE 6 and Escorez tackifying resin. Control examples are also provided.

FIG. 1 depicts the advantageous aspects of the present invention in graph form.

TABLE 1

| H-1-B Homopolymer | 1B—CoE 6 Butene-1-ethylene Copolymer with 6% Ethylene Comonomer | Polymer Composition Homopolymer:Copolymer | Tackifying Resin ARKON P-85 | Properties | |
|---|---|---|---|---|---|
| | | | | SAFT, F | LAP SHEAR, psi |
| 0 | 50 | 0:100% | 50 | 157 | 237 |
| 50 | 0 | 100:0% | 50 | 191 | 45 |
| 12.5 | 37.5 | 20:80% | 50 | 193 | 154 |
| 25 | 25 | 50:50% | 50 | 202 | 165 |
| 37.5 | 12.5 | 80:20% | 50 | 200 | 87 |

TABLE 2

| H-1-B Homopolymer | 1B—CoE 6 Butene-1-ethylene Copolymer with 6% Ethylene Comonomer | Polymer Composition Homopolymer:Copolymer | Tackifying Resin ESCOREZ 5380 | Properties | | | |
|---|---|---|---|---|---|---|---|
| | | | | SAFT, F | LAP Shear | T-Peel Al pli | T-Peel PP pli |
| 0 | 50 | 0:100% | 50 | 154 | — | 2.67 | 1.87 |
| 10 | 40 | 20:80% | 50 | 168 | — | 1.52 | 1.47 |
| 20 | 30 | 40:60% | 50 | 183 | — | 1.22 | 2.2 |
| 30 | 20 | 60:40% | 50 | 190 | — | 1 | 3.13 |
| 40 | 10 | 80:20% | 50 | 192 | — | 0.37 | 1.66 |
| 50 | 0 | 100:0% | 50 | 197 | — | 0.67 | 0.85 |

The novel adhesives can be prepared using from about 10% to about 90% by weight of a blend of polybutylene with differing melt flows and viscosities. These polybutylenes can be produced by mixing from zero to 1000 ppm of Lupersol 101 peroxide, available from Pennwalt, with polybutylene pellets and extruding the mixture through a Brabender extruder at 200° C. with an average residence time of 2 minutes. The adhesives can more preferably be prepared with 45–55% by weight of the polybutylene blend.

To formulate the novel adhesives the butene-1 ethylene copolymer and butene-1 homopolymer blend is added to a substantially non-polar aliphatic tackifier resin. 10–90% by weight of the tackifying resin can be used to prepare the novel adhesive depending on the amount of polybutylene blend used. It is preferred to use 45–55% by weight of the tackifying resin. Included in the definition of substantially non-polar aliphatic tackifier resins are the polyterpene resins. For the most part, partially hydrogenated C9 based hydrocarbon resins, as well as C5 stream resins, and polyterpenes can be used in amounts of from about 20% by weight to about 60% by weight and preferably about 30% to about 50% by weight. Resins with 85° C. softening points were used (Arkon P-85 and Escorez 5380) and 120° C. softening points (Arkon P-120) were used. The two 85° C. melting point resins showed crystalline melting points and Tgs above room temperature; $T_m = 85°$ C., $T_g = 35°$ C. for the Arkon P-85 and $T_m = 80°$ C., $T_g = 29°$ C. for the Escorez 5380 resin. Both resins formed clear melts and clear solids upon cooling in polybutylene polymers. The Arkon P-120 showed a crystalline melting point at 125° C. and Tg of 67° C. The resin formed a clear melt and a clear solid upon cooling in the polybutylene polymer.

The waxes of the present invention are microcrystalline waxes. The waxes are optional and may be added in amounts up to 30 phr of the overall formulation and preferably 5–15 phr based on the weight of the entire adhesive composition. Shellwax ® 500 can be used. A sufficient amount of the wax can be used to effect a lower viscosity without a substantial decrease in service temperature of the adhesive.

Atactic polypropylene can be advantageously added to the novel adhesives, up to 30 phr of the novel composition. 5–20 phr atactic polypropylene may be used within the scope of this invention.

Small amounts of nucleating agent may be added advantageously to the novel adhesives, in amounts up to 50 phr and preferably from about 5 to about 25 phr based on the entire adhesive formulation. Stearamide, substituted stearamides such as N,N,ethylene-di-stearamide, para-amino benzoic acid, and polymers such as high density polyethylene and polypropylene can be added to the novel adhesive as the nucleating agent.

Antioxidants can be added to the adhesive formulation, in amounts from about 0.1 phr to about 0.5 phr based on the entire formulation.

Hindered phenolic antioxidants have been used in the adhesive blend with good results. Tetrakis methylene (3,5-di-tert-butyl-4-hydroxyhydrocinnamate) methane (Irganox ® 1010 from Ciba-Geigy) can be added to the blend at a level of about 0.3 phr. Other antioxidants which may be used in similar amounts are Goodrite 3114, Ethanox 330 and Irganox 1076.

The following illustrates the present invention and is not intended to limit the scope of the inventive concept.

ADHESIVE PREPARATION

Adhesives as described above and identified in Tables 1 and 2, can be prepared using either a small Brabender compound head (approximately 50 cc capacity) or a one quart sigma blade mixer. The test formulations are easily blended using preheated equipment (170°–180° C.) by introducing the two polybutylene polymers, mixing the polymers until a soft, homogeneous mass is formed, and then gradually introducing the remaining ingredients, preferably with the tackifying resin first, followed by the remaining ingredients. Mixing times should be 20 minutes.

ADHESIVE FILM

Thin adhesive films (125 to 200 microns) can be prepared from the adhesive formulation by casting the blended adhesive onto release coated polyester film (i.e., onto the release coated side) using a pair of heated nip rolls that are adjusted to produce the desired gap, with resulting adhesive thickness. Preheated adhesive (preheated at about 130° C.) can be poured onto a polyester film and hand drawn through the heated nip rolls. Using this technique, adhesive films with dimensions, a meter in length by 15 centimeters in width, can be produced with a small quantity (<60 gms) of adhesive, so that very small quantities of adhesive can be evaluated.

TESTING METHODS

Once cooled and allowed to set, adhesives made by the above process were used to prepare test specimens. Polypropylene, aluminum and polyethylene can be used as substrates for the test specimens. Test specimens are prepared by placing a square of film of adhesive between the substrate, and then joining the film and substrate under moderate contact pressure with a heat sealer, such as a Sentinel heat sealer, to form lap shear or SAFT bonded substrate specimens.

1. SAFT: Shear Adhesion Failure Temperature—The upper service temperature limit of the adhesive was estimated by the SAFT test. A 25×25 mm lap shear specimen was formed with the substrate of interest and the adhesive as the interlayer between the substrate surfaces. The specimen was suspended in a temperature programmed oven, and the free end of the specimen was loaded at 500 or 1000 gm. The temperature was programmed to rise at a rate of 22° C./hour. The SAFT was taken at the temperature at which the bond failed and the weightload fell.

2. Lap Shear Strength—A 25×25 mm specimen was formed with the substrate of interest and the adhesive as the interlayer between the substrate surfaces. Specimens were drawn apart at a rate of 1.27 mm/min. in an Instron tester, until the maximum force required to break the bond was obtained. 3 mm (125 mils) anodized aluminum was used as a substrate in these tests.

3. T-Peel—A 25 mm×150 mm laminate test specimen was formed with the substrate of interest and the adhesive as the interlayer between the substrate surfaces. The laminate surfaces were placed in an Instron tester, one surface in the lower jaw. The jaws were separated at a rate of 25 cm/min. The time required to peel the surfaces was recorded continuously. The maximum and minimum values were noted, as well as failure mode, i.e., adhesive, cohesive, or a combination. The test approximated a peel angle of about 180° C. T-peel tests were carried out on both aluminum and polypropylene substrates.

It was found that the simultaneous high SAFT and low T-peel were functions of the proportions of poly-1-butene homopolymer to poly-1butene copolymer in the blend.

Deviations in the above described materials and/or methods may be apparent to one of ordinary skill in the art.

What is claimed is:

1. A hot melt adhesive comprising a blend of:
   (A) a butene-1-polymer blend of from 10% by weight to 90% by weight of an at least partially crystalline copolymer of butene-1 and ethylene, wherein the ethylene content is from about 1 mole percent to about 20 mole percent of said copolymer, and from 10% by weight to 90% by weight of a butene-1 homopolymer;
   (B) from about 20% by weight to about 60% by weight of a substantially non-polar tackifying resin selected from the group; consisting of polyterpenes and aliphatic resins from $C_5$-$C_9$ hydrocarbon streams or hydrogenated resins thereof with softening points in a range of 70° C. to 130° C. and
   (C) from about 0.1 phr to about 0.5 phr of an antioxidizing agent.

2. The hot melt adhesive of claim 1, wherein said blend comprises:
   from about 45% by weight to about 55% by weight of said butene-1-polymer blend;
   from about 45% by weight to about 55% by weight of said tackifying resin,
   from about 0.1 phr to about 0.5 phr of said antioxidizing agent.

3. The hot melt adhesive of claim 1, further comprising up to 30 phr of a microcrystalline wax.

4. The hot melt adhesive of claim 1, further comprising up to 30 phr of atactic polypropylene.

5. The hot melt adhesive of claim 1, further comprising a nucleating agent.

6. The hot melt adhesive of claim 5, wherein said nucleating agent is a member of the group substituted stearamides, stearamide, high density polyethylene, polypropylene, and para-amino-benzoic-acid.

7. The hot melt adhesive of claim 1, wherein said antioxidizing agent is tetrakis methylene (3,5-di-tert-butyl-4-hydroxy-hydrocinnamate)methane.

* * * * *